Figure 4:
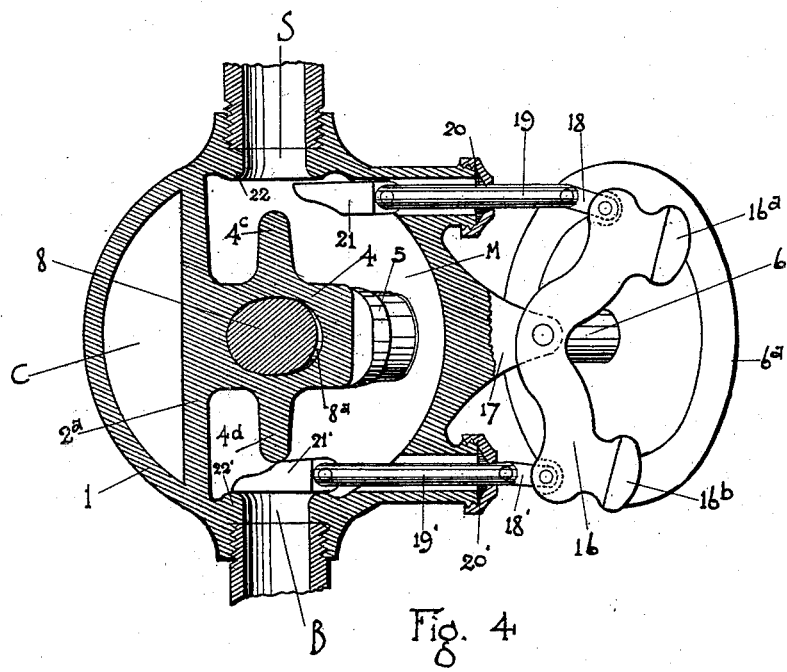

No. 654,602. Patented July 31, 1900.
W. BUNTING, Jr.
MIXING AND CONTROLLING VALVE FOR BATHING APPARATUS.
(Application filed Jan. 26, 1900.)
(No Model.) 2 Sheets—Sheet 1.
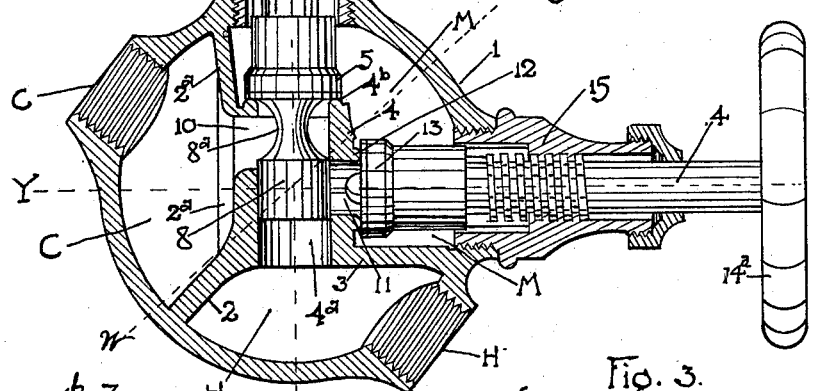
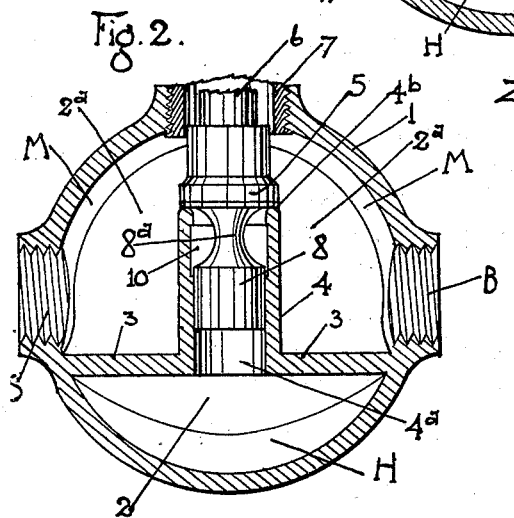
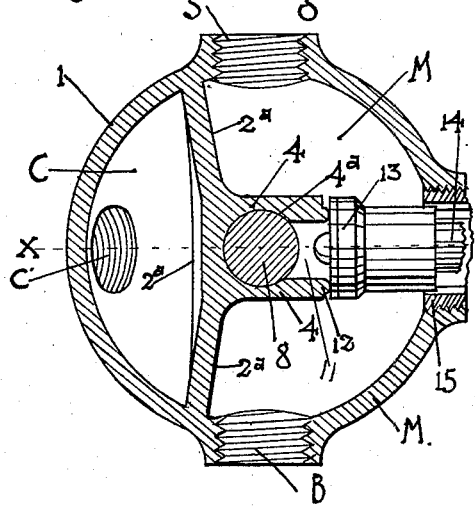
Witnesses
M. C. Jaquith
Wm. L. Baker
Inventor
Wm Bunting Jr.
by Louis H. Hemiman
Attorney.

No. 654,602. Patented July 31, 1900.
W. BUNTING, Jr.
MIXING AND CONTROLLING VALVE FOR BATHING APPARATUS.
(Application filed Jan. 26, 1900.)
(No Model.) 2 Sheets—Sheet 2.

Witnesses
M. C. Jaquith
E. L. Copeland

Inventor.
W<sup>m</sup> Bunting Jr.
by Louis H. Harriman
Attorney.

UNITED STATES PATENT OFFICE.

WILLIAM BUNTING, JR., OF BROOKLINE, MASSACHUSETTS.

MIXING AND CONTROLLING VALVE FOR BATHING APPARATUS.

SPECIFICATION forming part of Letters Patent No. 654,602, dated July 31, 1900.

Application filed January 26, 1900. Serial No. 2,873. (No model.)

*To all whom it may concern:*

Be it known that I, WILLIAM BUNTING, Jr., a citizen of the United States, and a resident of Brookline, in the county of Norfolk and State of Massachusetts, have invented certain new and useful Improvements in Mixing and Controlling Valves for Bathing Apparatus, of which the following is a specification.

This invention has for its principal object the production of a valve which so controls the supply of hot and cold water to a shower-bath or bath-tub that all possibility of the bather being scalded by hot water on account of his unfamiliarity with the valves or from opening the hot-water valve too wide is precluded. According to my invention I provide an arrangement in which, no matter which valve is opened first, the cold-water supply will be turned on first in sufficient quantities to prevent the scalding of the bather. I also provide an arrangement whereby the temperature of the water is practically controlled by a single valve.

In the drawings, Figure 1 is a central cross-section taken on the line X of Fig. 3. Fig. 2 is a cross-section taken on the line Z of Fig. 1. Fig. 3 is a cross-section taken on the line Y of Fig. 1. Fig. 4 is a cross-section of a modification, taken on a line $w$ of Fig. 1.

The main casing 1 of the valve is preferably spherical in form and is divided into three chambers C, H, and M—a cold-water, a hot-water, and a mixing chamber, respectively. Chambers C and H are provided with inlets C' H', respectively, and chamber M is provided with shower and bath outlets S and B at the top and bottom of the casing, respectively. The partition 2, which is located at one side of the middle of the casing and extends from top to bottom thereof, separates chamber C from chamber H, and a continuation $2^a$ of said wall 2 separates chamber C from chamber M. A partition or wall 3, which extends from top to bottom of the casing, separates chambers H and M. The walls 2, $2^a$, and 3 support a central chamber 4, which is provided with a central passage $4^a$, extending from and terminating in chambers H and M. This passage is of the same diameter throughout, is circular in cross-section, and is provided with a valve-seat $4^b$ at the end which terminates in the chamber M. A valve 5 is arranged to seat on said valve-seat $4^b$ and is provided with a stem 6, which extends outwardly and is threaded in the usual bonnet 7. A cylindrical plug 8, which closely fits the passage $4^a$, is connected to the base of valve 5 by means of stem $8^a$, which is of such size as to permit the free circulation of water about it through the passage $4^a$. A cold-water port 10 connects the cold-water chamber C with the passage $4^a$ and is located adjacent to the end of the latter, which terminates in the chamber M, and a hot-water port 11 connects the passage $4^a$ with the mixing-chamber M and is located on the opposite end of said passage. A valve-seat 12 is provided at the end of the port 11, and a valve 13 in chamber M seats thereon. The stem 14 of said valve is threaded into the bonnet in the usual way and is preferably arranged at right angles to the valve-stem 6.

The distance between the face of valve 5 and the end of cylindrical plug 8 is such that when the valve is on its seat the end of the plug will extend a short distance beyond the port 11 and close communication between said port and chamber H. The length of plug 8 is greater than the diameter of port 11, so that at all times said plug will close communication between ports 10 and 11 through the passage $4^a$. The valve-port which is closed by the valve 5 is in constant communication with the cold-water chamber C through the port 10. Therefore if the valve 5 is opened slightly the cold water will immediately flow into the mixing-chamber through port 10; but as communication will still be closed between chamber H and port 11 no hot water can flow into chamber H, whether valve 13 is open or not. Chamber M will therefore first be filled with cold water. Before any hot water can flow into chamber M valve 13 must be opened. Assuming now that valve 13 is fully open, the hot water will begin to flow through port 11, and the point will soon be reached where the cold water is turned on in full force. If it is found that up to this point the water is not hot enough, the valve 5 is opened still more, and the end of plug 8 next the valve 5 will then begin to cut off the cold-water supply, while the hot water will be turned on still more, and if valve 5 is opened so far as to close communication between port 10 and chamber M all the cold water will be cut off and only hot water be discharged into chamber M. It will also be seen that the temperature of the water may be wholly controlled by one valve and that valve 13 becomes essential only to prevent the flow of hot water when only cold water is desired and to also prevent any slight leakage which might occur about plug 8.

From the foregoing it will be apparent that I provide a valve which will absolutely preclude all possibility of the bather being scalded by opening the wrong valve first or by opening the hot-water valve too wide. With this valve, even if the hot-water valve is fully open, the water will first be cold and then will be gradually increased in temperature as the cold-water valve is opened until the desired temperature is reached.

As previously stated, the mixing-chamber M is provided with two outlets S and B, the outlet S at the top leading to an overhead shower and the outlet B at the bottom leading to a bath-tub. It will be obvious that some means must be provided for closing both of these outlets, so that water may be discharged through one or the other of them, as desired. The most obvious way of producing this result would be to provide a separate valve in each pipe. This way would, however, be objectionable for several reasons if used in connection with the valve just described and under certain conditions would annul many of the advantages secured thereby. For example, if both ports S and B were closed the bather might open the main valves 5 and 13 before opening either port S and B to such an extent that the water which would be discharged when either of these ports were finally opened would be scalding hot and he might be severely scalded, particularly if he should happen to open the port to the shower. If, on the contrary, one of these ports were constantly open, the water would at once begin to be discharged upon the opening of valve 5, and the bather would at once be able to test the temperature of the water, and thus the liability of his being scalded would be avoided. It would also often happen that when the bather wished to use the shower the port leading thereto would be closed and the other open, or vice versa, so that some trouble would be caused in getting the proper valves opened and closed. In Fig. 4 of the drawings I show an arrangement which is designed to be used in connection with the valves described in Figs. 1, 2, and 3. By using this arrangement I make it impossible to close both shower and bath ports at the same time, so that there will be no danger of the bather being scalded in the way above referred to. The objection to the bather's being obliged to open or close these ports separately is also obviated, as the act of closing one opens the other. A vertically-arranged lever 16 is pivoted at its middle point to the lug 17, midway between the valve-stems 6 and 14, said lug being cast integral with the casing 1. Said lever 16 is of the same shape on each side of its pivot and is provided at each end with thumb-pieces $16^a$ $16^b$, which may be labeled, respectively, "Shower" and "Bath" on the faces thereof. Links 18 18' are pivoted, respectively, to the upper and lower ends of lever 16, and these links are also pivoted to the ends of valve-stems 19 19'. Stems 19 19' pass through the packing-washers 20 20' and have the valves 21 21' pivoted to the ends thereof. These valves are simple forms of sliding gate-valves and are provided with flat faces and inclined backs. Lugs $4^c$ $4^d$ project laterally from the internal chamber 4 and are so arranged that each engages the inclined back of its adjacent valve and forces the same against their respective seats 22 22'. Said seats 22 22' are formed integrally with the casing around the ports of S and B. As both valves are connected to opposite ends of lever 16, obviously when either end of the lever is pushed in to close one of the valves the other will be opened, and it will be impossible to close both ports S and B at the same time. When lever 16 is in its intermediate position, both valves will be half open.

Where this attachment is not applied to the valve, the main casing will be cast as shown in Figs. 1, 2, and 3; but when it is to be applied the casting will be provided with the additional features shown in Fig. 4.

Having described my invention, what I claim as new, and desire to secure by Letters Patent of the United States, is as follows:

1. A combined hot and cold water valve consisting of a casing having a hot, and a cold water chamber, and a mixing-chamber, a passage which terminates at one end in said hot-water chamber and at its opposite end in said mixing-chamber, a hot-water port and a cold-water port which connect the sides of said passage with the mixing and cold-water chambers, respectively, a valve which is adapted to close the mixing-chamber end of said passage, an extension carried by said valve which is adapted to close said passage beyond said hot-water port when said valve is closed, to close communication between the hot and cold water ports through said passage, and to permit a free passage from said cold-water port to said valve.

2. A combined hot and cold water valve consisting of a casing having a hot, and a cold water chamber and a mixing-chamber, a passage which terminates at one end in said mixing-chamber and at its opposite end in said hot-water chamber, a hot and a cold water port which connect the sides of said passage with said mixing and cold-water chambers, respectively, a valve which is adapted to close the mixing-chamber end of said passage, an extension carried by said valve which is located in said passage and is adapted to close the same between said hot-water port and its chamber, and between said hot and cold water ports and to permit a free connection between said cold-water port and valve, said extension extending beyond said hot-water port when the valve is closed so that it will not open communication between said hot-water chamber and its port until after the valve is partly opened.

3. A combined hot and cold water valve consisting of a casing having a hot, and a cold water chamber, and a mixing-chamber, a passage which terminates at one end in said mixing-chamber and at its opposite end in said hot-water chamber, a hot and a cold water port which connect the sides of said passage with said mixing and cold-water chambers, respectively, a valve which is adapted to close the mixing-chamber end of said passage, an extension carried by said valve which is located in said passage, said extension consisting of a plunger which closely fits said passage, and extends beyond said hot-water port on both sides thereof when the valve is closed, and of a stem of reduced size which connects said plunger with the face of said valve and permits a free flow from said cold-water port to said valve.

4. A combined hot and cold water valve consisting of a casing having a hot, and a cold water chamber, and a mixing-chamber, a passage which terminates at one end in said hot-water chamber and at its opposite end in said mixing-chamber, a hot-water port and a cold-water port which connect the sides of said passage with the mixing and cold-water chambers, respectively, a valve which is adapted to close the mixing-chamber end of said passage, an extension carried by said valve which is adapted to close said passage beyond said hot-water port when said valve is closed, to close communication between the hot and cold water ports through said passage, and to permit a free passage from said cold-water port to said valve, and a second valve in said mixing-chamber which is adapted to close said hot-water port.

5. A combined hot and cold water valve consisting of a casing having a hot, and a cold water, and a mixing chamber, a straight passage which connects said mixing and said hot-water chamber, a hot-water port, which connects said mixing-chamber and said passage which is arranged adjacent to the hot-water-chamber end of said passage, a cold-water port which connects said cold-water chamber and said passage and is arranged adjacent to the mixing-chamber end of said passage, a valve-seat on the mixing-chamber end of said passage, a valve therefor, a piston which is connected to the face of said valve and fits closely in said passage, said piston extending beyond said hot-water port when said valve is seated, and constantly closing said passage between said ports in all positions of the latter, the extent to which said valve may be opened being sufficient to permit said piston to close said passage between said cold-water port and said valve-seat when the valve is fully open.

6. A valve-casing comprising two inlet-ports and an outlet-chamber to which both of said ports lead, a separate valve for each of said ports, said valves being arranged at an angle to each other, and a supplemental valve connected to one of said valves which is adapted to control the flow through both ports.

7. A valve-casing comprising two inlet-ports and an outlet-chamber into which both of said ports lead, a valve-seat at each port, a separate valve for each seat, said valves being arranged so that they operate in the same planes and at an angle to each other, and an extension carried by one of said valves which is adapted to control the flow through the other port.

8. A valve-casing comprising two inlet-ports and an outlet-chamber into which both of said ports lead, a valve-seat at each port, a separate valve for each seat, said valves being arranged so that they operate at an angle to each other, and an extension carried by one of said valves which is adapted to control the flow through the other port.

9. A valve-casing comprising two inlet-ports and an outlet-chamber to which said ports lead, a separate valve for each of said ports, and a supplemental valve connected to and controlled by one of said valves which is adapted to control the flow through both ports.

10. A hot and cold water valve comprising a casing having a chamber, hot and cold water ports leading thereto, valves for controlling said ports, two discharge-ports from said chamber, which lead from opposite sides of said casing, a separate valve for closing each discharge-port, and a lever to which both of said valves are connected on opposite sides of the fulcrum thereof, whereby, when one of said valves is opened, the other will be closed.

11. A hot and cold water valve comprising a chamber, hot and cold water ports leading thereto, valves for controlling said ports, two discharge-ports which lead from said chamber, a separate valve for closing each discharge-port, and means connecting said valves which will cause one of them to be opened when the other is closed, whereby a constantly-open discharge-port from said chamber is maintained.

In testimony whereof I have affixed my signature in presence of two witnesses.

WM. BUNTING, JR.

Witnesses:
LOUIS H. HARRIMAN,
M. C. JAQUITH.